United States Patent
Chawla et al.

(10) Patent No.: US 9,781,492 B2
(45) Date of Patent: Oct. 3, 2017

(54) SYSTEMS AND METHODS FOR MAKING VIDEO DISCOVERABLE

(71) Applicant: Ever Curious Corporation, Palo Alto, CA (US)

(72) Inventors: Chander Chawla, Palo Alto, CA (US); Rajiv Jain, Mountain View, CA (US)

(73) Assignee: Ever Curious Corporation, Palo Alto, CA (US)

( * ) Notice: Subject to any disclaimer, the term of this patent is extended or adjusted under 35 U.S.C. 154(b) by 0 days.

(21) Appl. No.: 15/211,896

(22) Filed: Jul. 15, 2016

(65) Prior Publication Data

US 2017/0019720 A1 Jan. 19, 2017

Related U.S. Application Data

(60) Provisional application No. 62/194,124, filed on Jul. 17, 2015.

(51) Int. Cl.
*G06F 3/00* (2006.01)
*G06F 13/00* (2006.01)
(Continued)

(52) U.S. Cl.
CPC ..... *H04N 21/8133* (2013.01); *G06F 3/04842* (2013.01); *H04M 1/72527* (2013.01); *H04M 1/72561* (2013.01); *H04N 7/185* (2013.01); *H04N 21/222* (2013.01); *H04N 21/4126* (2013.01); *H04N 21/4143* (2013.01); *H04N 21/41407* (2013.01); *H04N 21/4722* (2013.01); *H04N 21/4725* (2013.01); *H04N 21/4728* (2013.01); *H04N 21/47202* (2013.01); *H04N 21/482* (2013.01); *H04N 21/6125* (2013.01); *H04N 21/6587* (2013.01);
(Continued)

(58) Field of Classification Search
CPC ........... H04N 21/8133; H04N 21/8586; H04N 21/8547; H04N 21/6587; H04N 21/41407; H04N 21/482; H04N 21/4126; H04N 7/185; H04M 1/72527; H04M 1/72561; G06F 3/04842
See application file for complete search history.

(56) References Cited

U.S. PATENT DOCUMENTS 8,560,583 B2 * 10/2013 Mallinson ......... G06F 17/30026
705/14.4
8,910,053 B2 12/2014 Arn
(Continued)

FOREIGN PATENT DOCUMENTS

EP 2432221 A2 3/2012
WO 2009/144536 A1 12/2009

OTHER PUBLICATIONS

Search Report for International Application No. PCT/US2016/042610, mailed on Sep. 30, 2016, 10 pages.

*Primary Examiner* — Hunter B Lonsberry
*Assistant Examiner* — Patrick A Ryan

(57) ABSTRACT

Systems and methods for discovering and interacting with video on a frame level are disclosed. A person viewing a video can capture a frame from a video using a mobile device. The captured frame and information about items within the frame are displayed on the user's mobile device. The user can learn about the items or interact with the displayed items such as purchasing the items using the mobile device.

19 Claims, 14 Drawing Sheets

(51) Int. Cl.

| | |
|---|---|
| *H04N 5/445* | (2011.01) |
| *H04N 21/81* | (2011.01) |
| *H04N 21/222* | (2011.01) |
| *H04N 21/4728* | (2011.01) |
| *H04N 21/414* | (2011.01) |
| *H04N 21/472* | (2011.01) |
| *H04N 21/6587* | (2011.01) |
| *H04N 21/8547* | (2011.01) |
| *H04N 21/858* | (2011.01) |
| *H04N 21/482* | (2011.01) |
| *H04M 1/725* | (2006.01) |
| *G06F 3/0484* | (2013.01) |
| *H04N 7/18* | (2006.01) |
| *H04N 21/41* | (2011.01) |
| *H04N 21/4143* | (2011.01) |
| *H04N 21/4722* | (2011.01) |
| *H04N 21/4725* | (2011.01) |
| *H04N 21/61* | (2011.01) |

(52) U.S. Cl.
CPC ..... *H04N 21/8153* (2013.01); *H04N 21/8547* (2013.01); *H04N 21/8586* (2013.01)

(56) References Cited

U.S. PATENT DOCUMENTS

| | | | |
|---|---|---|---|
| 9,277,157 B2 | 3/2016 | Averbuch | |
| 9,294,611 B2 | 3/2016 | Arn | |
| 2009/0294538 A1 | 12/2009 | Wihlborg et al. | |
| 2011/0037777 A1 | 2/2011 | Lindahl et al. | |
| 2011/0289532 A1* | 11/2011 | Yu | H04N 21/4126 725/38 |
| 2012/0017236 A1* | 1/2012 | Stafford | A63F 13/00 725/32 |
| 2012/0233641 A1 | 9/2012 | Gambino | |
| 2013/0340003 A1* | 12/2013 | Davis | H04N 21/482 725/38 |
| 2014/0282743 A1 | 9/2014 | Howard et al. | |
| 2015/0110457 A1 | 4/2015 | Abecassis et al. | |
| 2016/0027067 A1 | 1/2016 | Zindler et al. | |

\* cited by examiner

SYSTEMS AND METHODS FOR MAKING VIDEO DISCOVERABLE

This application claims the benefit under 35 U.S.C. §119 (e) to U.S. Provisional Application No. 62/194,124 filed on Jul. 17, 2015, which is incorporated by reference in its entirety.

FIELD

The invention relates to systems and methods for discovering and interacting with OTT content such as streaming video on a frame level. A user of a video can capture a frame from a video using a mobile device. The captured frame and information about items within the frame are displayed on the user's mobile device. The user can learn about the items and interact with items displayed on the user's mobile device such as purchasing the items.

BACKGROUND

When watching video a user can want to know more about what is being viewed. For example, a user may want to know more about the actors, the location where a scene is being filmed, the clothing being worn by the actors, the furnishings in a room, the vehicles, or any other item in or feature about a scene. Accessing this information is constrained because the video content is image-based whereas a search to access the information is conventionally text-based. Remembering what was viewed and then later finding out about the information using a text-based search is cumbersome and inconvenient.

Audio-based technologies are available that use content recognition or simply have websites that provide details about the video content. Although such methods for accessing information about video content can provide scene-level information or more general information about the video content, existing methods do not provide frame-level information. Frame-level information refers to content concerning an individual video frame. Users prefer instantaneous information about the video content they are viewing.

A number of technological and social developments provide a context and motivation for developing methods to access video content interactively. The use of mobile devices is becoming ubiquitous and multitasking in which mobile devices are used simultaneously while performing other activities such as viewing video is becoming second nature. The delivery of video content by over-the-top (OTT) methods such as streaming video is also increasing. It is estimated that over 65% of households in the United States have a streaming device and the number is expected to increase dramatically in the coming years. As a result, the video being viewed at home will increasingly be delivered by streaming video content providers and not by broadcast or cable networks. The ability to provide OTT content to households is being facilitated by access to broadband networks and delivery of broadband service directly to the home. The quality of streaming high-definition video to the home is already acceptable, and increasing broadband speeds and infrastructure deployment will only improve the service and viewer experience. Another interrelated trend is the increasing development and adoption of mobile commerce. Currently, Internet commerce is estimated to be only 10% of the total individual consumer commerce and only a small fraction of that is done through a mobile device. However, consumer transactions through mobile devices are being facilitated by mobile provider purchasing applications. As a result, consumers are becoming increasingly more comfortable with making purchases over a mobile device.

Improved methods for accessing and interacting with OTT content such as streaming media are desired.

SUMMARY

According to the present invention, methods of discovering over-the-top (OTT) content, comprise: a user viewing OTT content on an OTT device; establishing a connection between the OTT device and the user's mobile device; the user, using the mobile device, capturing a frame of the OTT content; and displaying the captured frame on the user's mobile device.

According to the present invention, methods of discovering OTT content comprise: one or more users viewing OTT content playing on an OTT device; wherein each of the one or more users has a mobile device and each of the mobile devices is connected to the OTT device; a user pausing the playing of the OTT content; and downloading a frame associated with the paused OTT content on one or more of the user's mobile devices.

According to the present invention, methods of capturing a discoverable frame from OTT content, comprise: providing a tagging database, wherein the tagging database comprises an association of tagged frames of OTT content, timestamps associated with the tagged frames, tagged items associated with the tagged frames, and metadata associated with the tagged items; playing the OTT content on an OTT device; a user viewing the OTT content and capturing, on a mobile device, a tagged frame of the viewed OTT content; sending a request for a timestamp from the mobile device to the OTT device; the OTT device generating a timestamp; sending the timestamp from the OTT device to the mobile device; associating the timestamp with a frame number associated with a tagged frame; forming a URL associated with the frame number; pulling information associated with the frame number using the URL; and displaying the information associated with the frame number on the mobile device.

According to the present invention, methods of discovering OTT content, wherein the method comprises: a user viewing OTT content on a video display, wherein, the OTT content comprises at least one tagged frame; and each of the at least one tagged frames comprises at least one tagged item; the user capturing a tagged frame of the at least one tagged frames using a mobile device; and displaying the captured tagged frame and the at least one tagged item associated with the captured tagged frame on the user's mobile device.

According to the present invention, systems for discovering OTT content, comprise: a main server; a mobile device bidirectionally connected to the main server; an OTT device bidirectionally connected to the main server; a user database connected to the main server; a tagging databased connected to the main server; and an OTT content server connected to the OTT device; wherein the OTT device comprises a content software application; and wherein the mobile device comprises a capture software application.

According to the present invention, system and methods of discovering over-the-top (OTT) content comprise a user viewing OTT content on an OTT device; establishing a connection between the OTT device and the user's mobile device; the user, using the mobile device, capturing a frame of the OTT content; and displaying the captured frame on the user's mobile device.

According to the present invention, system and methods of discovering OTT content comprise playing OTT content on an OTT device; one or more users viewing the OTT content playing on the OTT device; wherein one or each of the plurality of users has a mobile device and each of the mobile devices can be connected to the OTT device; a user pausing the playing of the OTT content; and automatic downloading a frame associated with the paused OTT content on one or more of the user's mobile devices.

According to the present invention, system and methods of capturing a discoverable frame from OTT content comprise providing a tagging database, wherein the tagging database comprises an association of tagged frames of OTT content, timestamps associated with the tagged frames, tagged items associated with the tagged frames, and metadata associated with the tagged items; providing the OTT content from an OTT device to a display; a user viewing the OTT content and capturing, on a mobile device, a tagged frame of the viewed OTT content; sending a request for a timestamp from the mobile device to the OTT device; the OTT device generating a timestamp; sending the timestamp from the OTT device to the mobile device; associating the timestamp with a frame number associated with a tagged frame; forming a URL associated with the frame number; pulling information associated with the frame number using the URL; and displaying the information associated with the frame number on the mobile device.

According to the present invention, methods for discovering OTT content comprise a user viewing OTT content on a video display, wherein, the OTT content comprises at least one tagged frame; and each of the at least one tagged frames comprises at least one tagged item; the user capturing a tagged frame of the at least one tagged frames using a mobile device; and displaying the captured tagged frame, the at least one tagged item associated with the selected tagged frame on the mobile device.

According to the present invention, systems for discovering OTT content comprise a main server; a mobile device bidirectionally connected to the main server; an OTT device bidirectionally connected to the main server; a user database connected to the main server; a tagging databased connected to the main server; and OTT content storage connected to the mobile device and to the OTT device; wherein the OTT device comprises a content application; and wherein the mobile device comprises a capture application.

BRIEF DESCRIPTION OF THE DRAWINGS

Those skilled in the art will understand that the drawings described herein are for illustration purposes only. The drawings are not intended to limit the scope of the present disclosure.

Reference is now made to certain embodiments of methods for regulating activities on electronic devices. The disclosed embodiments are not intended to be limiting of the claims. To the contrary, the claims are intended to cover all alternatives, modifications, and equivalents.

DETAILED DESCRIPTION

Systems and methods provided by the present disclosure are directed to enabling a viewer of OTT content to explore, discover, learn about, and obtain information about the OTT content at the frame level.

As a general example, a person is watching OTT content such as a streaming video on a video display. While watching the streaming video, the viewer wonders about something s/he is viewing on the video display, such as the name of an actor, the clothing and fashion items the actor is wearing, or the location where the scene was filmed. To learn more, using a mobile device, the viewer captures a frame from the streaming video. Information about items associated with the captured frame are pulled from a database. The captured frame, items associated with the frame and information about the items are displayed on the viewer's mobile device. The viewer can then interact with the displayed frame, the displayed items, and the displayed information. Interacting can involve sharing through social media, saving for later access, exploring through embedded hyperlinks, or purchasing. The streaming video can continue playing without interruption while the viewer is interacting with the content displayed on the viewer's mobile device. Multiple users can have personal experiences with the same streaming video by capturing frames they find interesting and want to learn more about. In other aspects of the invention, users can engage in a shared experience. For example, a streaming video that is being viewed by one or more users can be paused and the frame and information about the frame can be automatically downloaded onto one or more of the user's mobile devices. While the streaming video is paused or after the frame and information are stored on the user's mobile device, tone or more users can interact with the frame-level information displayed on their individual mobile devices.

The methods enable a user to discover information about People, Places, and Products and/or to purchase items being viewed on a video. The methods provided by the present disclosure enable users to immediately learn more about items they are viewing on a video and/or interact with the items they are viewing such as through social media or by shopping.

As used herein, an OTT device refers to a software application on an OTT device, and a mobile device refers to a software application on a mobile device.

Figure 1:
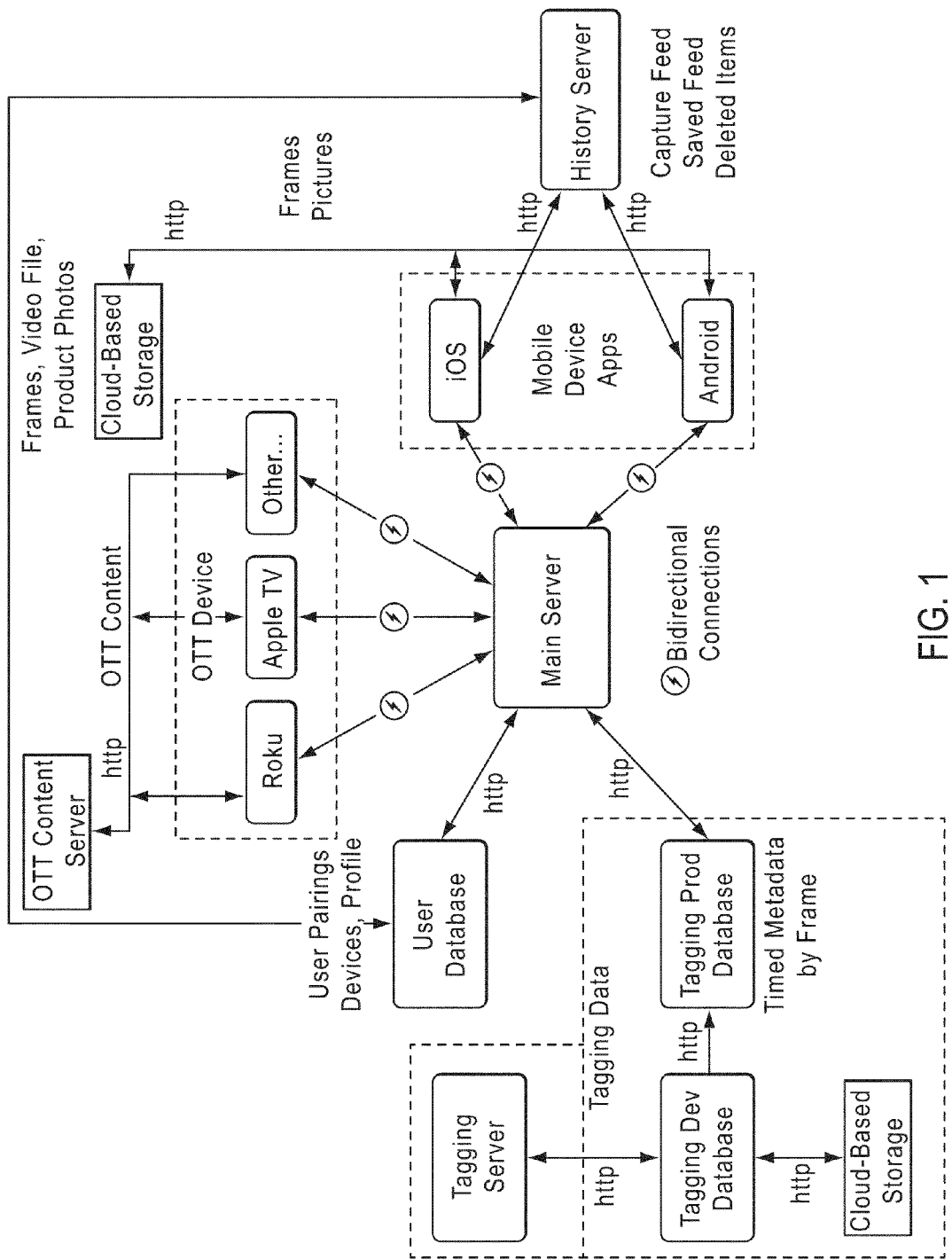
FIG. 1 shows an overview of an example of a technology platform provided by the present disclosure.

An example of a technology platform for enabling the methods provided by the present disclosure is shown in FIG. 1. The general features of the platform include a mobile device, a main server, an OTT device, and databases.

A mobile device can be any suitable mobile device and can operate on any suitable operating system such, for example, iOS™ or Android™. An enabled mobile device incorporates an inventive software application that can be downloaded from the Internet. The mobile device comprises a display and has the ability to display images. Examples of suitable mobile devices include iPhone, Galaxy, Xperia, Nexus, and Lumia.

The platform includes an OTT device such as, for example, Roku, Apple TV, Android TV, Amazon Fire TV, Chromecast, PlayStation®, Xbox, Samsung TV, LG TV, Sony TV, Vizio TV, or other Smart TV OTT device, web browser, or native application. An OTT device incorporating an inventive software application is referred to as an enabled OTT device. An OTT device can access OTT content such as streaming media and display the OTT content on a video display. OTT content includes, for example, streaming video.

The main server includes bidirectional connections such as socket connections between mobile devices and OTT devices. The main server can be a single server or multiple servers depending on the service architecture. The main server can operate on any suitable operating system such as, for example, Ubuntu or Linux, can be based on any suitable application platform such as, for example, Node.js, socket.io, or sails.js, XMPP, MQTT, WebSockets, Java Sockets, and ejabberd and can include databases such as Redis, MongoDB, or Amazon AWS S3. In certain embodiments, a database comprises cloud-based storage or can be a server.

The main server database stores OTT content such as videos, video frames, video files, and product images. An OTT content server can be connected to one or more OTT devices.

A user database can be connected to the main server. The user database includes information such as OTT deviceIDs, mobile deviceIDs, user profiles, and user pairings. User pairings refer to an association between an OTT device and a user's mobile device. A user's mobile device can be paired to multiple OTT devices, and an OTT device can be paired to multiple mobile devices.

The tagging database is also connected to the main server. A tagging database includes information about tagged frames corresponding to tagged OTT content. OTT content comprises a plurality of frames. In tagged OTT content, certain frames of the plurality of frames are tagged frames. A tagged frame can be a specific frame of the plurality of frames. In addition to the image associated with the frame, certain items of the image can be associated with the tagged frames. These items can be referred to as tagged items. Furthermore, metadata can be associated with some or all of the tagged items. Information about the metadata, the tagged items and the tagged frames are stored in the tagging database. The tagged items can be the actors, the clothing worn by the actors, furnishings in the scene, and/or other objects within the scene such as vehicles, products, buildings, scenery, or other information associated with the tagged items. One or several items within a tagged frame can be tagged. None or some of the tagged items can be associated with corresponding metadata. The tagging database includes the relationships between the tagged OTT content, tagged frames, tagged items, and the corresponding metadata. In addition, the tagging database can include other information associated with a tagged frame. The tagging database can be connected to an enabled mobile device via the main server. The frame images and images of the tagged items can be stored in cloud-based storage. The tagging database stores the associations between the frames, the items, and the metadata. Metadata can also be associated with a frame and can include, for example, the name of OTT content the frame is from, the frame number, and the provider.

Each of the one or more frames in a tagged OTT content such as a tagged streaming video or only certain of the frames can be tagged. For example, a streaming video can include frames that are played at 29.6 frames per second. All or a portion of these frames can be tagged. For example, there can be four (4) tagged frames per second, from 1 to 10 tagged frames per second, from 1 to 8 tagged frames per second, from 2 to 6 tagged frames per second, from 3 to 5 tagged frames per second, or from 1 to 29.6 frames per second.

The information in the tagging database is generated and compiled in a tagging development database, which can be connected to a tagging server and cloud-based storage. For certain frames of OTT content, certain items within a frame can be tagged and associated with metadata corresponding to the particular item. For example, a tagged frame can show an actor wearing shoes. The shoes worn by the ator can represent a tagged item. Metadata associated with the shoes can include the name of the retailer, brand, style, price, and/or a hyperlink additional information such as the company's website.

The platform shown in FIG. 1 also includes a history server, which is connected to a user's mobile device and to the user database. The history server captures and stores information about user activity related to the inventive application, the user's use of the application, and the user's interaction with the tagged content including the tagged frames and the tagged items. The user's activity information can be saved in the user database. The user information can include a user's profile, mobile devices used, OTT devices used, pairings between mobile devices and OTT devices, and history of a user's activity with tagged content.

To use the application, a user's mobile device can be paired with an OTT device that is playing OTT content and that a user is viewing or wishes to view on a video display. The video display playing the OTT content is separate from the display on the user's mobile device. In brief, the user watches the OTT content on the video display, and interacts with frame-level information downloaded onto the user's mobile device, where the user can then capture the frame-level information the user is interested in learning more about or the user just likes how the frame looks.

Figure 2A:
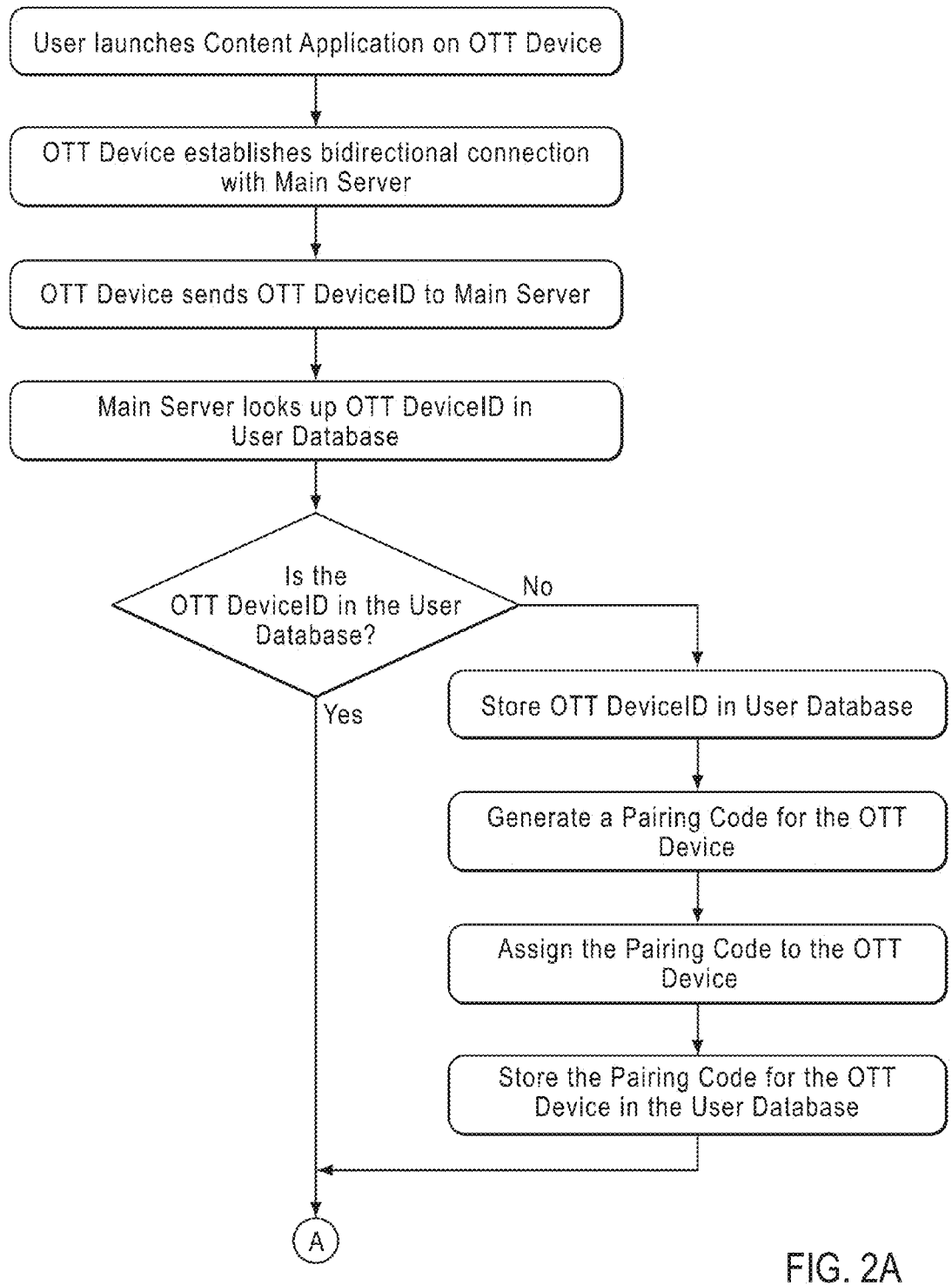
FIGS. 2A-2C show a pairing flow chart according to certain methods provided by the present disclosure.
Figure 2B:
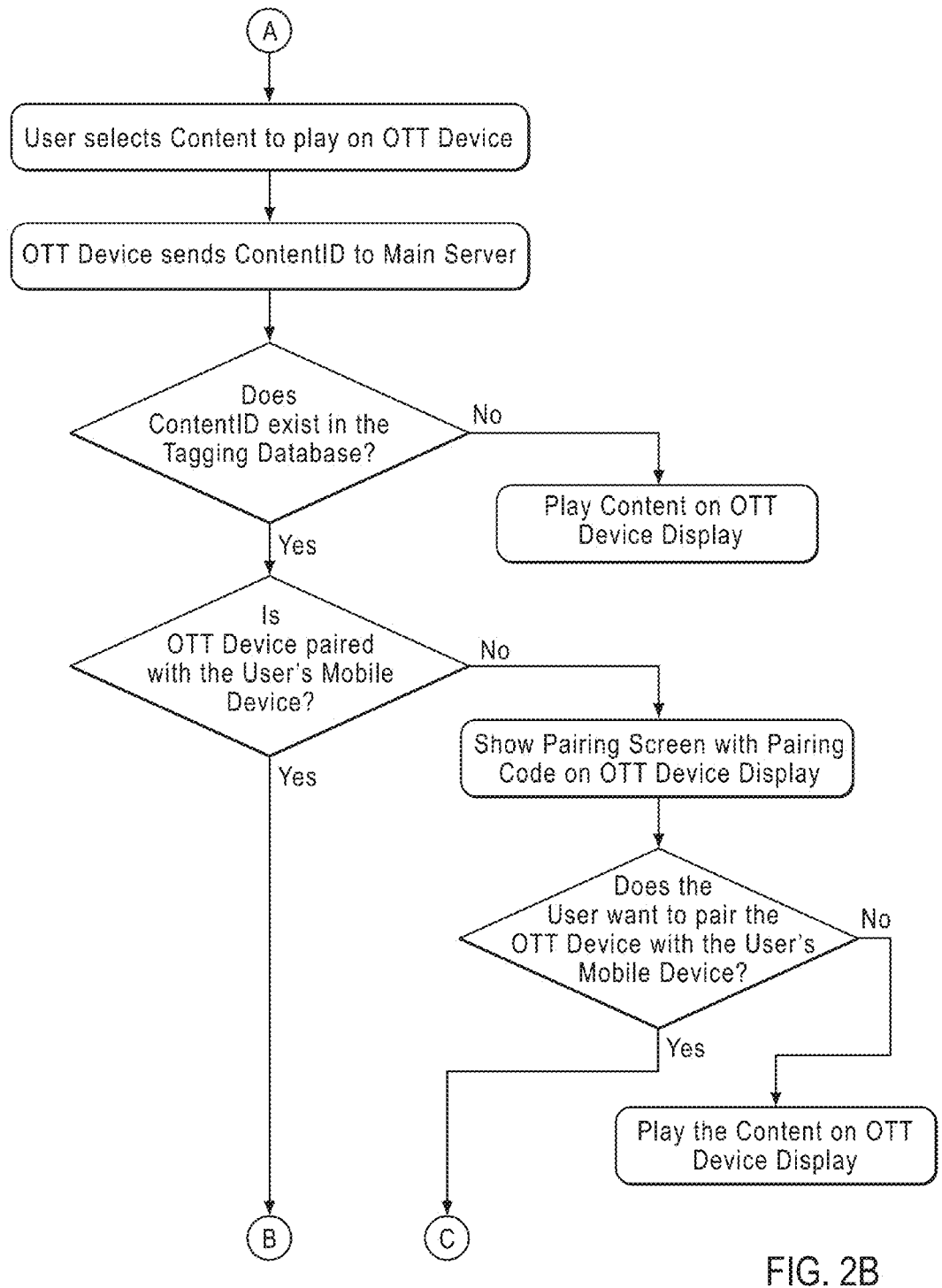
Figure 2C:
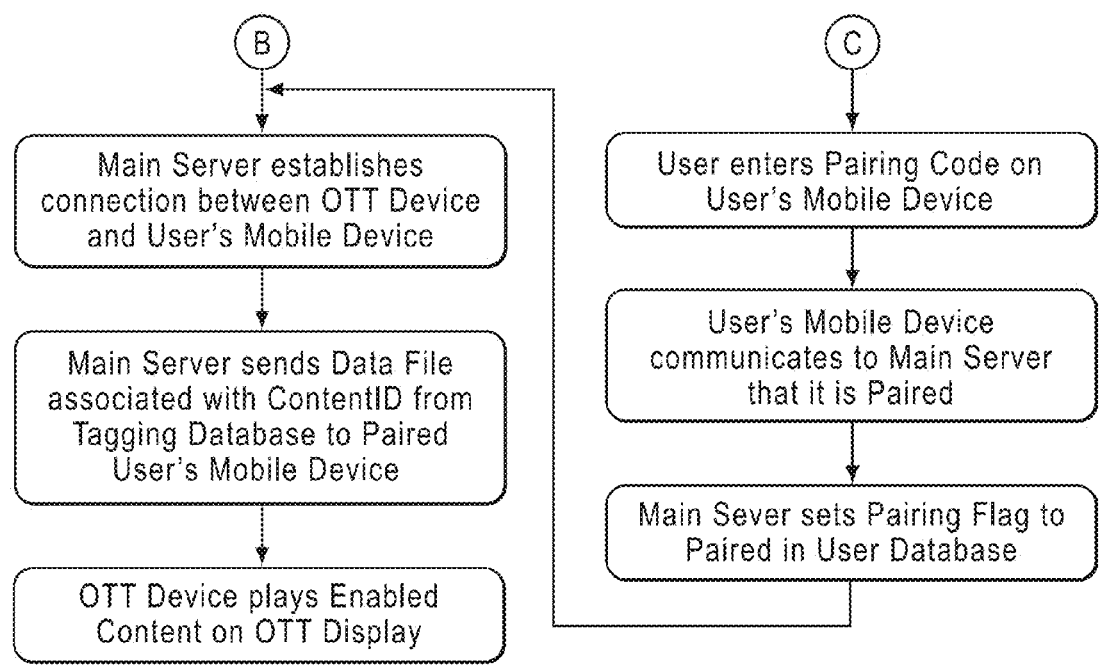

FIGS. 2A-2C are flow diagrams showing certain steps in an example of a pairing workflow.

A pairing workflow is used to establish coordinated, bidirectional communication between a user's mobile device, an OTT device that plays OTT content that the user is viewing, and a tagging database.

To initiate the process a user launches a content application on an OTT device.

The OTT device establishes bidirectional connection with a main server and communicates its OTT deviceID to a user database.

The main server looks up the OTT deviceID in the user database.

If the OTT deviceID is not in the user database, the OTT DeviceID is stored in the User Database, the main server generates a unique pairing code for the OTT device, assigns the pairing code to the OTT device and stores the pairing code for the OTT device in the user database. The pairing code is unique for each OTT device.

The pairing code can be a five (5) digit pairing code or other unique code.

If the OTT deviceID is found in the user database, the OTT device is already associated with a unique pairing code.

A user can then select OTT content to play.

Each OTT content is associated with a unique contentID. When the user plays OTT content, the OTT contentID associated with the enabled OTT content is sent from the OTT device to the main server. The main server establishes bidirectional connection between the OTT device and the user's mobile device.

In certain embodiments, the OTT device can determine whether the OTT content is enabled. For example, the main server can send a file containing the conentID for all enabled OTT content to the OTT device. When the user plays the OTT content, the OTT device determines whether or not the OTT content being played is enabled OTT content. If the OTT content is enabled, the OTT device sends the OTT contentID associated with the enabled OTT content to the main server.

The main server checks to determine whether the OTT contentID is stored in the tagging database. If the OTT contentID is stored in the tagging database, the OTT content is enabled.

Enabled OTT content refers to OTT content which is associated with a data file stored in a database such as the tagging database. In certain embodiments, a data file with the contentIDs for enabled OTT content is stored on a user's mobile device.

For example, enabled OTT content refers to OTT content in which at least one of the frames of the OTT content is a tagged frame. Enabled OTT content can also be referred to as tagged OTT content. Enabled OTT content is also associated with a tagging database. The enabled OTT content comprises a plurality of frames. At least one of the plurality of frames is associated with metadata stored in the tagging database. Each of the plurality of frames is associated with a timestamp, which can be the duration of time from an initial time. A tagged frame of the enabled OTT content is associated with corresponding metadata by the timestamp associated with the tagged frame. The timestamp can be encrypted.

If the OTT contentID is not stored in the tagging database, then the OTT content is not enabled OTT content and the OTT content plays on the display connected to the OTT device. Because the OTT content is not enabled, a user cannot interact with the OTT content using the enabling software application. This OTT content does not include at least one frame that is associated with information in the tagging database.

If the main server determines that the OTT contentID is stored in the tagging database, the OTT content is recognized as enabled OTT content.

The main server then determines whether the OTT device is paired with the user's mobile device. The pairings between OTT devices and the user's mobile device are stored in the user database.

If it is determined that the OTT device and the user's mobile device are not paired, the OTT device displays a pairing screen. The main server generates a unique pairing code for the OTT device and sends the pairing code and a request to pair to the OTT device, which displays the pairing code and a request-to-pair on the pairing screen. The request-to-pair prompts the user to download the enabling software application onto the user's mobile device and for the user to enter the unique code shown on the pairing screen on the user's mobile device.

Once the pairing code is entered on the user's mobile device, the mobile device sends an acknowledgement to the main server. The main server associates/pairs the mobile deviceID with the OTT deviceID, sets a status flag to true, and sends the status flag to the OTT device. The main server saves the pairing information in the user database. The main server establishes connection between the OTT device and the user's mobile device and sends a data file associated with the contentID from the tagging database to the user's paired mobile device. In certain embodiments, the data file can be stored in the tagging database.

If it is determined that the OTT device and the user's mobile device are already paired, the enabled OTT content begins playing on a video display, and a data file associated with the contentID of the enabled OTT content is downloaded onto the user's mobile device. The data file comprises information associated with tagged frames such as a timestamp, frame number, tagged items, the links or URLs for tagged items, and metadata associated with the tagged frame and tagged items. Data files for the tagged frames are stored in the tagging database.

The OTT device and the mobile device are paired and the user is viewing enabled OTT content on a video display connected to the OTT device. The user is ready to initiate the enabling software application from her/his mobile device.

A mobile device can be paired with more than one OTT device. Each OTT device is assigned a unique OTT deviceID. A user pairs her/his mobile device with an OTT device by entering the unique pairing code associated with the OTT deviceID at the pairing prompt. Pairing can also happen automatically. The OTT device and the user's mobile device are now paired. The pairing relationships for each mobile device/enabled OTT device pair are stored in the user database and/or in the user's mobile device. For example, the user's mobile device stores a list of OTT devices it is paired with.

Similarly, an OTT device can be paired with multiple mobile devices.

A mobile device user can switch from one paired OTT device to another paired OTT device that the mobile device is already paired with by selecting an OTT device from a pairing screen shown on the mobile device display. The pairing screen on the mobile device display shows a list of all OTT devices the mobile device is currently pair with. A user can switch from one OTT device to another by selecting a desired OTT device. A user's mobile device can also automatically switch between OTT devices.

After the user's mobile device and the OTT device have been paired, the user can capture enabled OTT content. In certain uses, a user is viewing OTT content on a video display and is holding an enabled and paired mobile device.

Figure 3A:
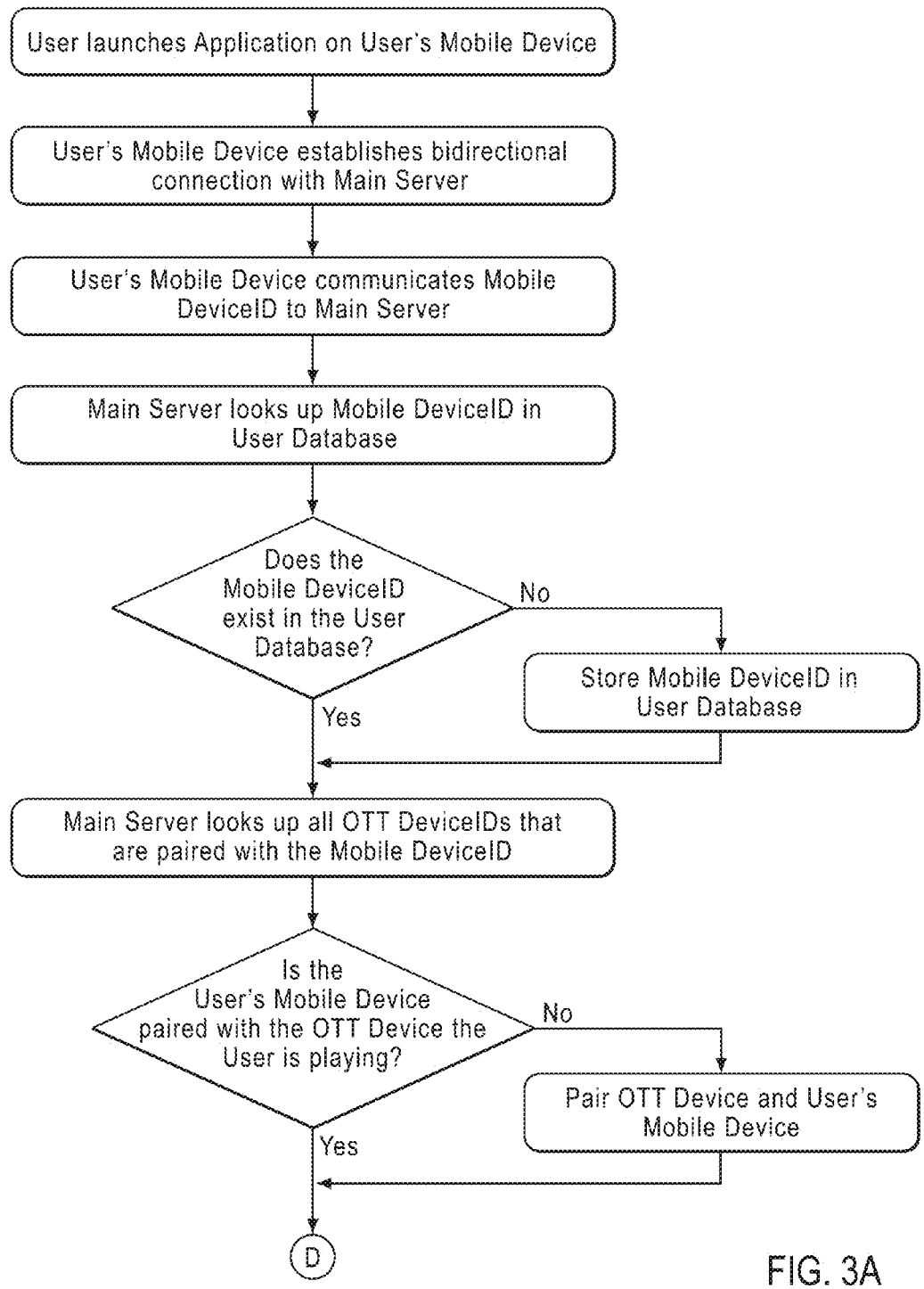
FIGS. 3A-3B are flow charts showing examples of steps in preparing to capture a tagged frame according to certain methods provided by the present disclosure.
Figure 3B:
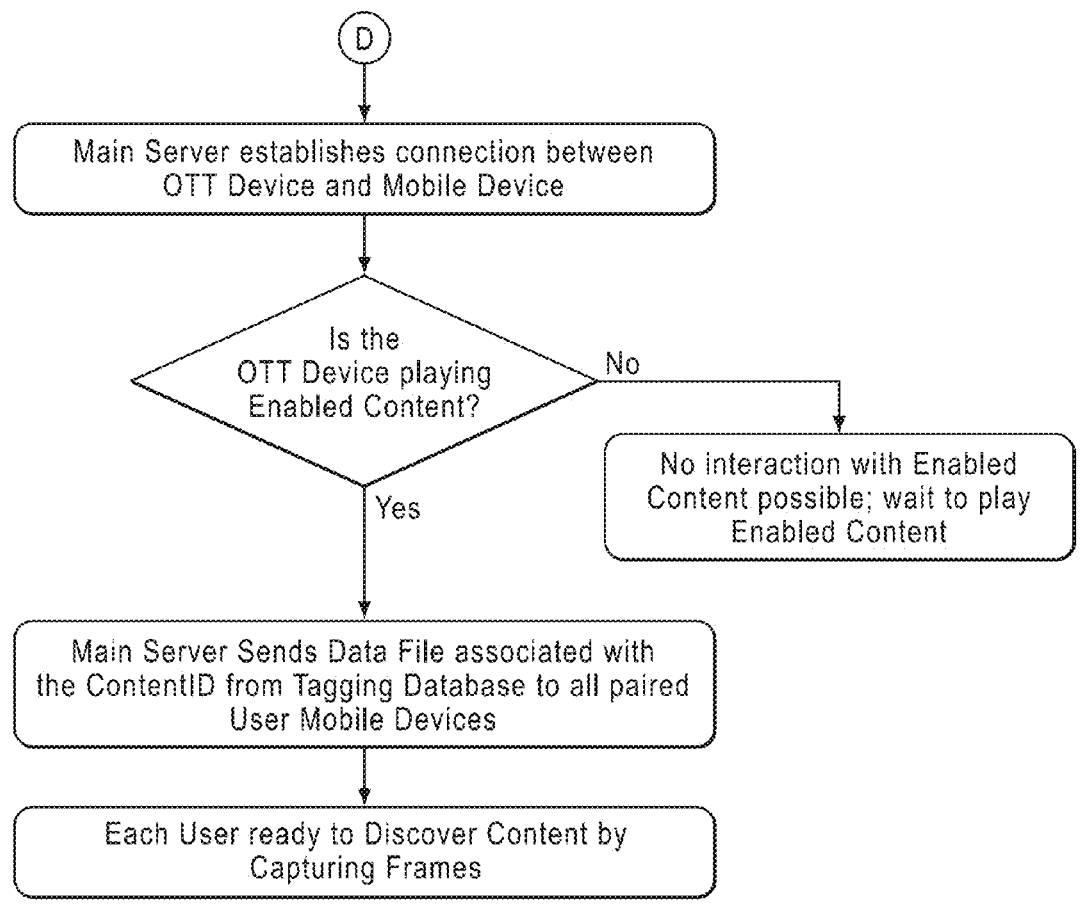

FIGS. 3A-3B are flow diagrams showing examples of steps associated with preparing to capture a tagged frame from enabled OTT content.

A user launches the software application from the user's enabled mobile device. The application establishes bidirectional connection with the main server and the user's mobile device and communicates its mobile deviceID to the main server. The main server looks up the mobile deviceID in the user database. If the mobile deviceID is not stored in the user database the mobile deviceID is stored in the user database. After the mobile deviceID is stored in the user database, or if the mobile deviceID is already stored in the user database, the main server looks up all OTT deviceIDs that are paired with the user's mobile deviceID. The main server then determines whether the OTT device that the user is playing and viewing is paired with the user's mobile device. If the OTT device being played and the user's mobile device are not paired, that the two devices are paired using the previously described pairing process. If or once the devices are paired, the user's mobile device communicates to the main server that the devices are paired. The main server then determines whether the paired OTT device is playing enabled OTT content. If the OTT device is not playing enabled content, then no interaction with the content is possible. The user can continue to view the OTT content or switch to view enabled OTT content. If enabled OTT content is playing on the video display, the main server sends a data file associated with the contentID for the enabled OTT content from the tagging database to the user's paired mobile device. If there are several mobile devices that are paired with the OTT device playing the enabled content, then the data file is sent to each of the paired mobile devices. The paired mobile devices are then ready to accept user-initiated actions such as capturing video frames of the enabled OTT content.

At this time, a user can be watching enabled OTT content, such as an enabled streaming video on a video display. The user is interested in discovering, exploring, learning about, and/or interacting with what is being watched on the video. For example, the user may be interested in learning something about the actors, about the location, about the clothing or furnishings, or may be interested in sharing or interacting with the video images through social media.

Figure 4A:
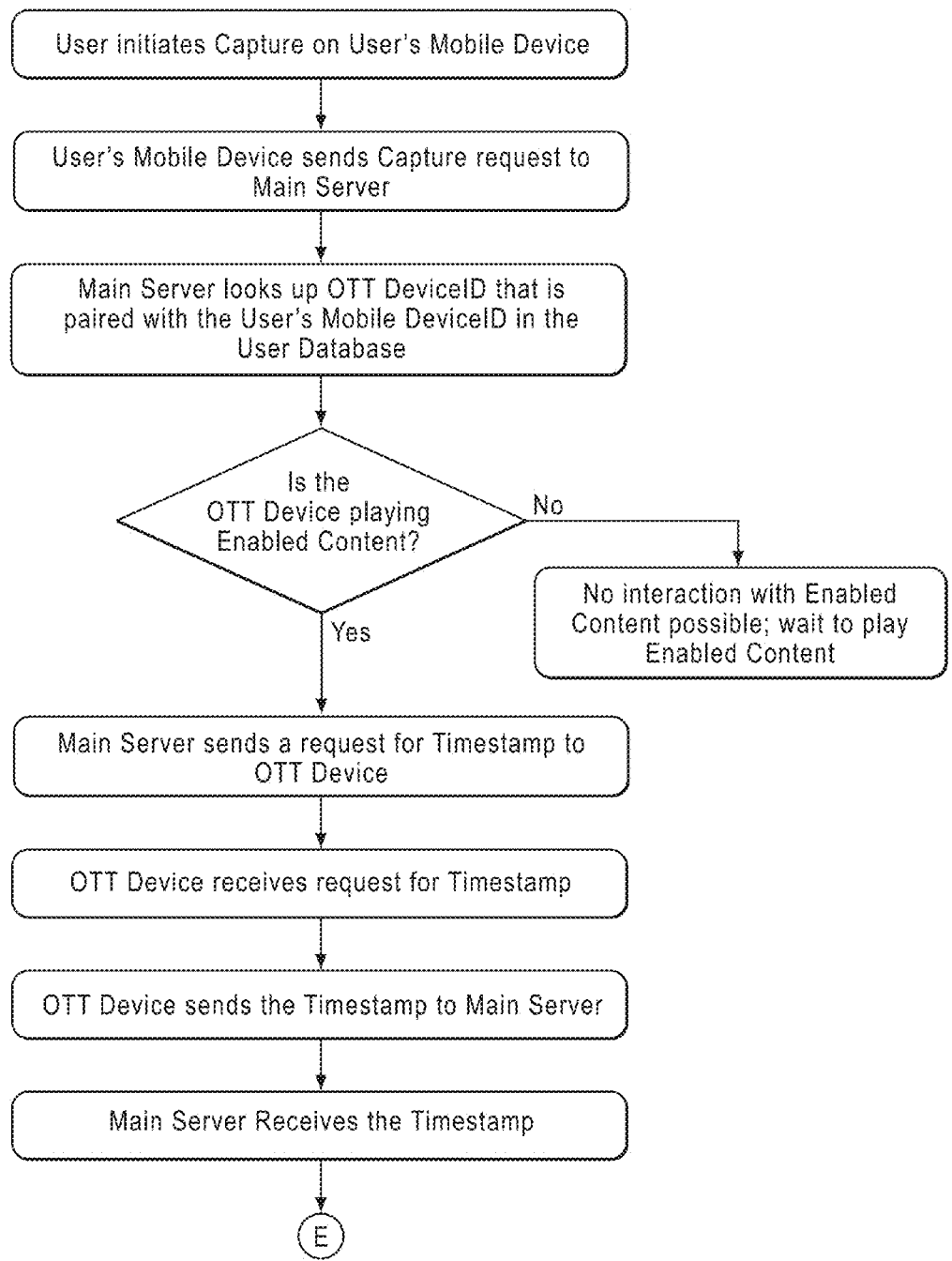
FIGS. 4A-4B are flow charts showing examples of steps in capturing a tagged frame according to certain methods provided by the present disclosure.
Figure 4B:
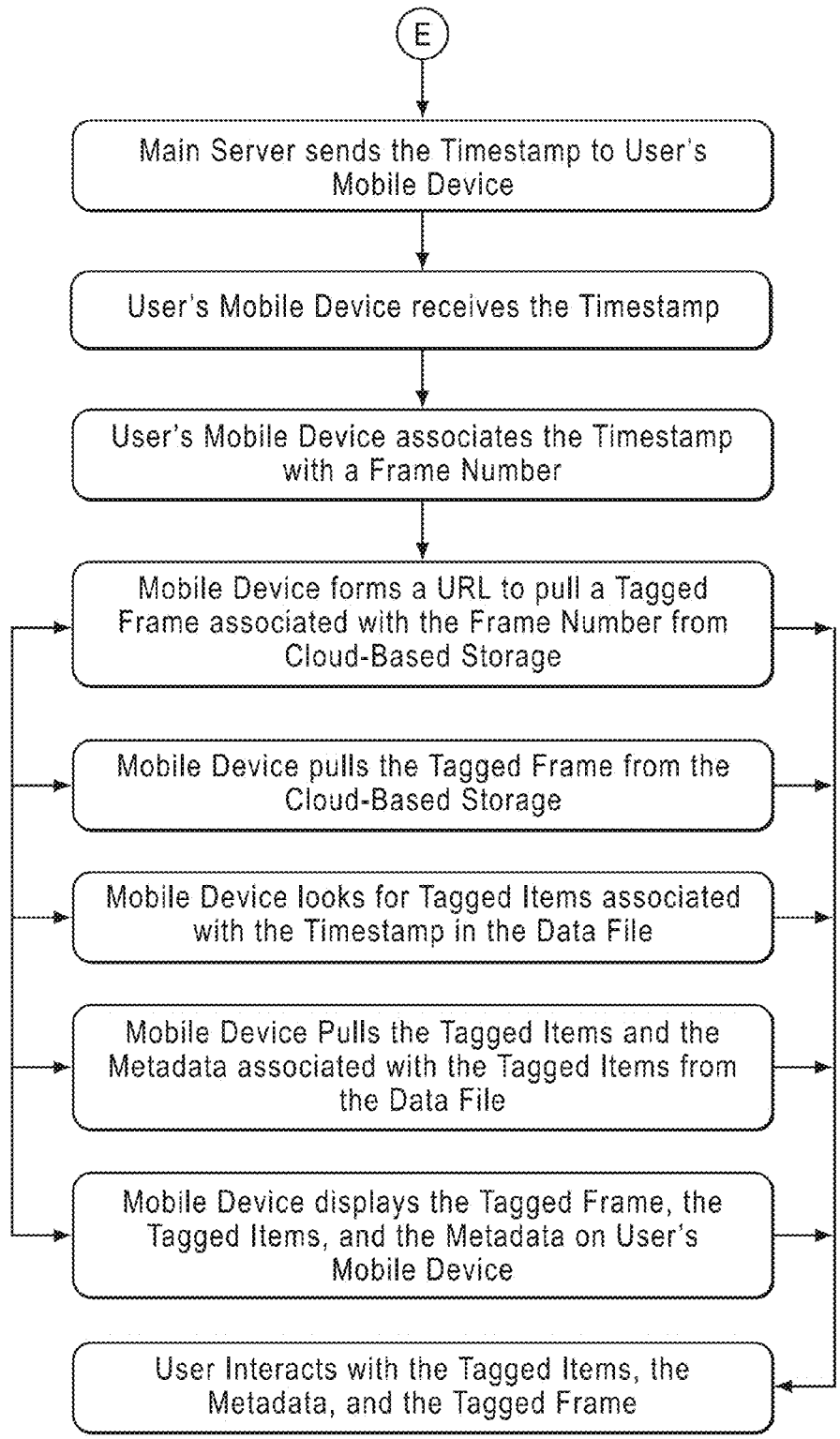

Examples of steps associated with capturing a frame are shown in FIGS. 4A-4B.

To capture OTT content, such as a video frame, a user initiates a capture request such as by pressing a capture button on the user's mobile device. The mobile device sends the user's capture request to the main server, which looks up the OTT deviceID that is paired with the user's mobile device from which the request was made in the user database.

If the paired OTT device is not playing enabled OTT content, it is not possible for the user to interact with the OTT content and the user can continue to play the non-enabled OTT content or can switch to viewing enabled OTT content.

If the paired OTT device is playing enabled OTT content the user's mobile device sends a request for a timestamp to the main server. The main server sends the request for timestamp to the OTT device. After receiving the timestamp request the paired OTT device sends the timestamp back to the main server, which receives and sends the timestamp to the enabled mobile device. The user's mobile device associates the received timestamp with a corresponding frame number of the enabled OTT content. The user's mobile device generates a URL to pull a tagged frame associated with the frame number from cloud-based storage. As previously disclosed, enabled OTT content comprises a plurality of frames. Each frame can be identified by a frame number numbered sequentially from the beginning of the OTT content and by a timestamp beginning from the start of the OTT content. Not every frame in an enabled OTT content is necessarily tagged. Using the requested timestamp, the application finds the tagged frame associated with the timestamp closest to that of the requested timestamp. For example, for OTT content with 29.6 frames per second, assume that every fourth frame is tagged, such as frames 4, 8, 12, 16, 20, 24, and 28. Each of these frames is associated with a timestamp and a frame number beginning from the start of the OTT content. A user initiates a frame capture on a mobile device by pressing a capture button, at a time corresponding to frame 21. The application finds the tagged frame with the timestamp closest to that of the requested timestamp, which in the example is tagged frame 20.

The user's mobile device pulls the tagged frame associated with the timestamp from cloud-based storage, the mobile device looks for tagged items associated with the timestamp in the data file, the mobile device pulls the tagged items and metadata associated with the tagged items from the data file, and the mobile device displays the tagged frame, the tagged items, and the metadata on the user's mobile device. These actions can take place simultaneously. The tagged items and/or associated metadata can be categorized and the displayed as categories on the user's mobile device. For example, all tagged items associated with clothing can be listed under a fashion category, and all tagged items associated with actors can be listed under a people category. The tagged items can be categorized, for example, in terms of people, places, objects, and fashion.

The user can then interact with the tagged frame, the tagged items, and/or metadata associated with the tagged frame and tagged items. Interaction includes, for example, sharing the tagged frame and/or tagged items on social media, purchasing tagged items, accessing hyperlinks to websites to learn more about the tagged items, accessing information about similar items, and/or saving the frame and/or tagged items associated with the tagged frame.

A user can also capture a frame that is not tagged. An untagged frame does not have an associated data file in the database. Capturing an untagged frame will display the untagged frame on a user's mobile device. Because a data file is not associated with the untagged frame, tagged items and metadata are not displayed and it is not possible for the user to interact with items or metadata. The user can interact with the displayed frame such as sharing the frame using social media. Thus, methods provided by the present disclosure include a user capturing a frame from a playing OTT content using the user's mobile device, and downloading the captured frame onto the user's mobile device.

In certain embodiments, instead of sending the data file from the tagging database to the mobile device upon establishing connection and having the mobile device pull the frame, tagged items, and metadata associated with the timestamp, the main server can send the frame, tagged items, and metadata to the user's mobile device. For example, the main server can receive the timestamp from the OTT device, associates the timestamp with a frame number, and pulls the tagged frame associated with the timestamp from cloud-based storage. The main server looks for tagged items associated with the timestamp in the tagging database and pulls the tagged items and metadata associated with the tagged items from the tagging database. The main server sends the frame, associated tagged items, and metadata to the user's mobile device, where the tagged frame, tagged items, and associated metadata are displayed.

In these methods the enabled OTT content continues to play while the user is interacting with the displayed frame, items and/or metadata. Once the user is finished interacting, the user can capture another tagged frame and interact with the tagged items associated with the newly displayed tagged frame. All captures are stored and the user can delete the captured information.

In the previous methods, the user's experience with the enabled OTT content can be considered a personal experience meaning that the user is interacting with the enabled OTT content through his/her mobile device. For example, an enabled streaming video can be playing in a room where several people are watching the video. Each person has a mobile device that once paired with the OTT device playing the video, each person can capture information about tagged frames the user is interested in. Each user in the room viewing the streaming video can have different interests and can choose to explore different aspects of video by capturing whichever tagged frame is desired. While user's are individually interacting with the video, the video continues playing so that other users can just enjoy the viewing experience.

In an alternative activity, a group of people watching a video may want to mutually share and participated in an interactive experience. For example, again a group of people can be viewing a video, with each user having a mobile device paired with the OTT device playing enabled OTT content. A user can pause the playing of the video and information associated with the timestamp of the pause event including the tagged frame, tagged items, and metadata associated with the pause event can be sent to each user's respective paired mobile device. Each user can then interact with the displayed information while the video is paused. In this scenario, each user receives the same information as each of the other users on his/her respective mobile device. This method is described in the following.

FIGS. 5A-5B and 6A-6B are flow diagrams showing steps in methods in which the enabled OTT content is paused while one or more user are interacting with the tagged content.

Figure 5A:
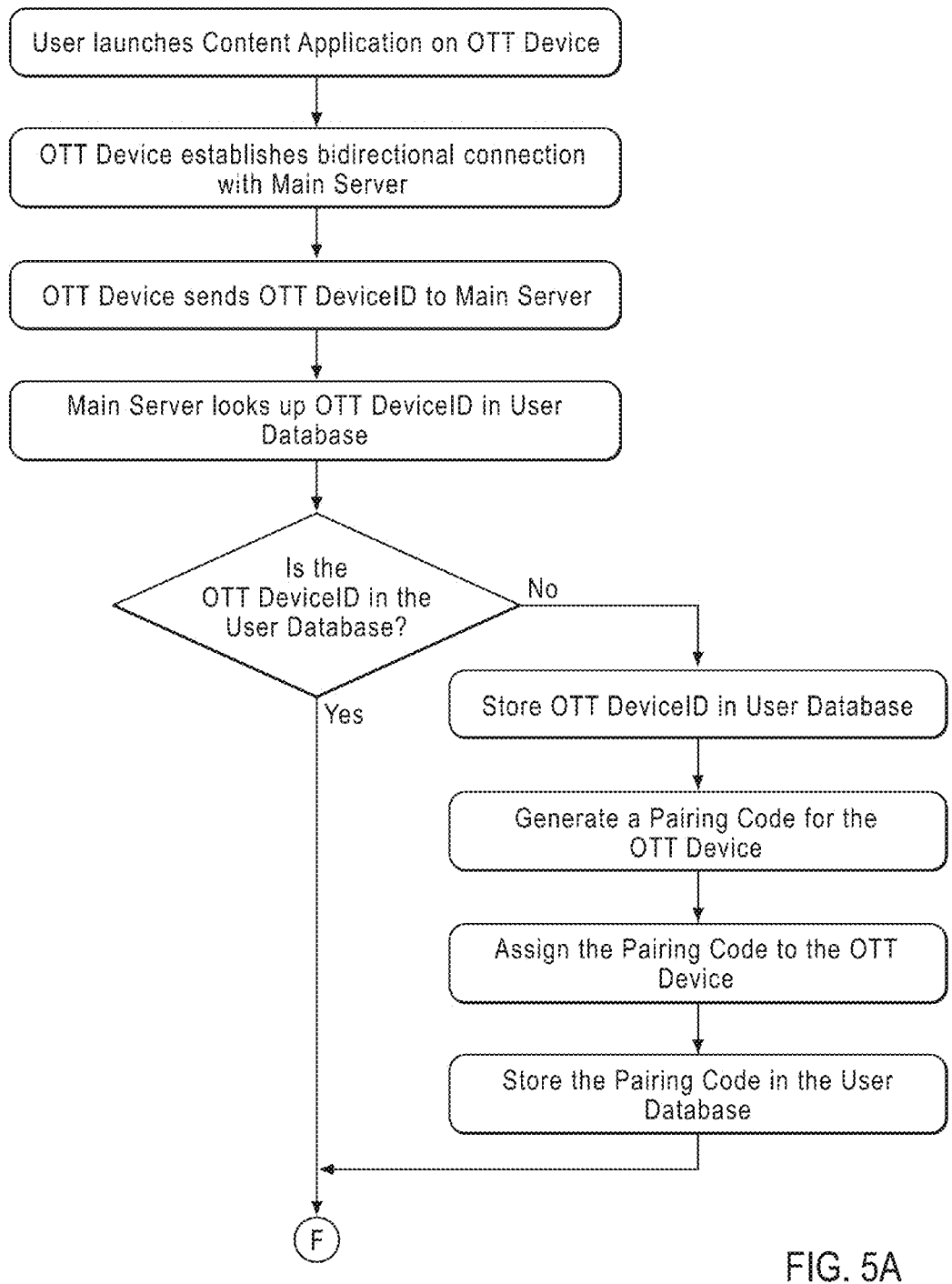
FIGS. 5A-5B are flow charts showing examples of steps in preparing to pause a video and capture a tagged frame according to certain methods provided by the present disclosure.
Figure 5B:
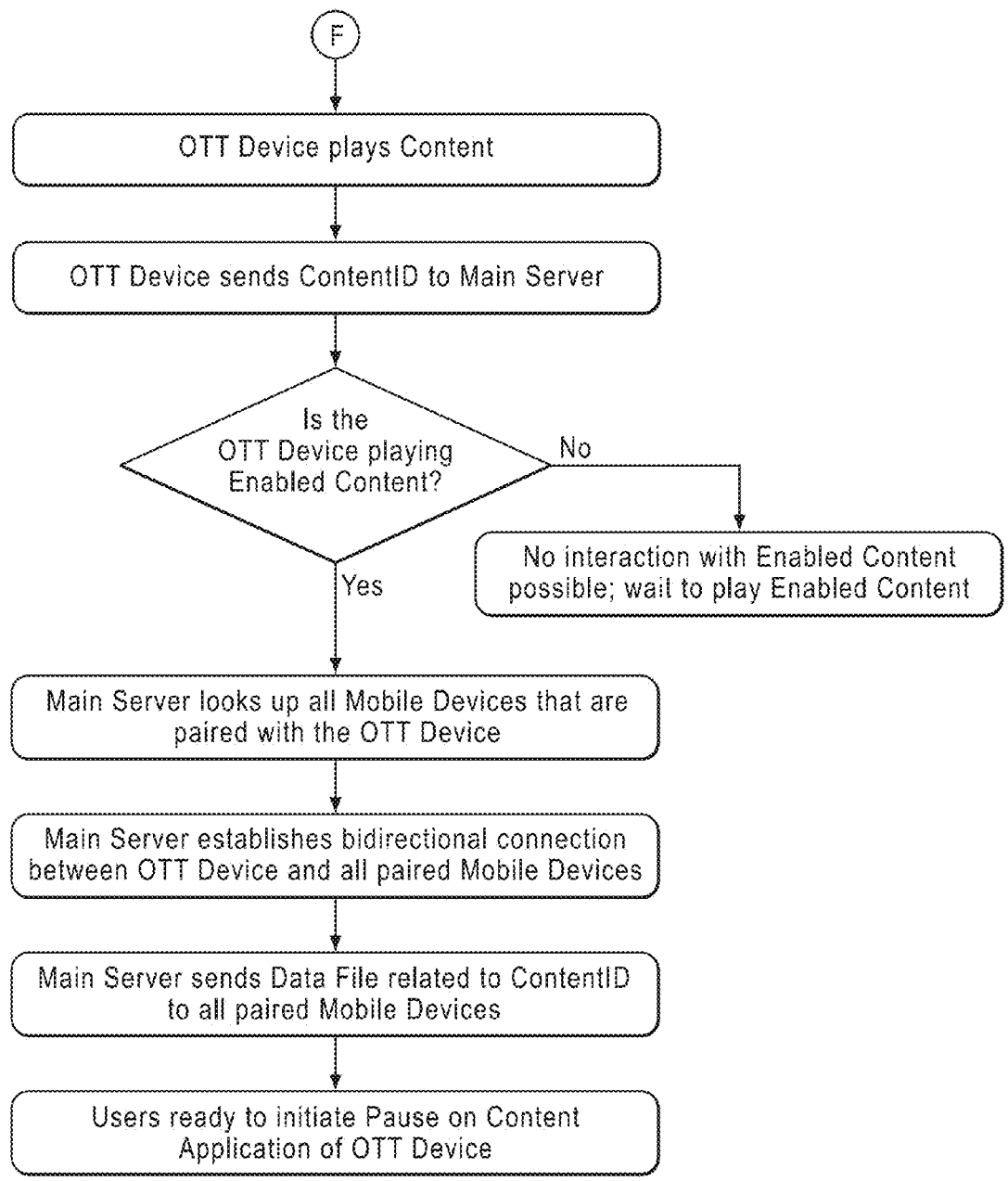

The steps in setting up a pause (ready to pause) are shown in FIGS. 5A and 5B.

A user launches the content application on an OTT device. The OTT device establishes bidirectional connection with the main server and communicates the OTT deviceID to the main server. The server looks up the OTT deviceID in the user database.

If the OTT deviceID is found in the user database, the OTT device plays the OTT content.

If the OTT deviceID is not found in the user database, the OTT deviceID is stored in the user database and a unique pairing code associated with the OTT device is generated. The assigned pairing code is stored in the user database. After a pairing code is stored, the OTT device plays the OTT content.

The OTT device sends the OTT contentID for the OTT content to the main sever, which determines whether the OTT content is enabled. If the OTT content is not enabled, it is not possible to interact with the OTT content until the user switches to playing enabled OTT content. The user can view the non-enabled OTT content but cannot interact with what s/he is viewing.

If the main server determines that the OTT content is enabled, the sever looks up all mobile devices that are paired with the OTT device playing the OTT content. The mobile devices can be paired with the OTT device using the methods disclosed herein. The main server establishes bidirectional connection between the OTT device and all paired mobile devices. The main server then sends a data file related to the contentID for the enabled OTT content that is playing to each of the paired mobile devices.

A user is then ready to initiate pause on the content application of the OTT device.

Figure 6A:
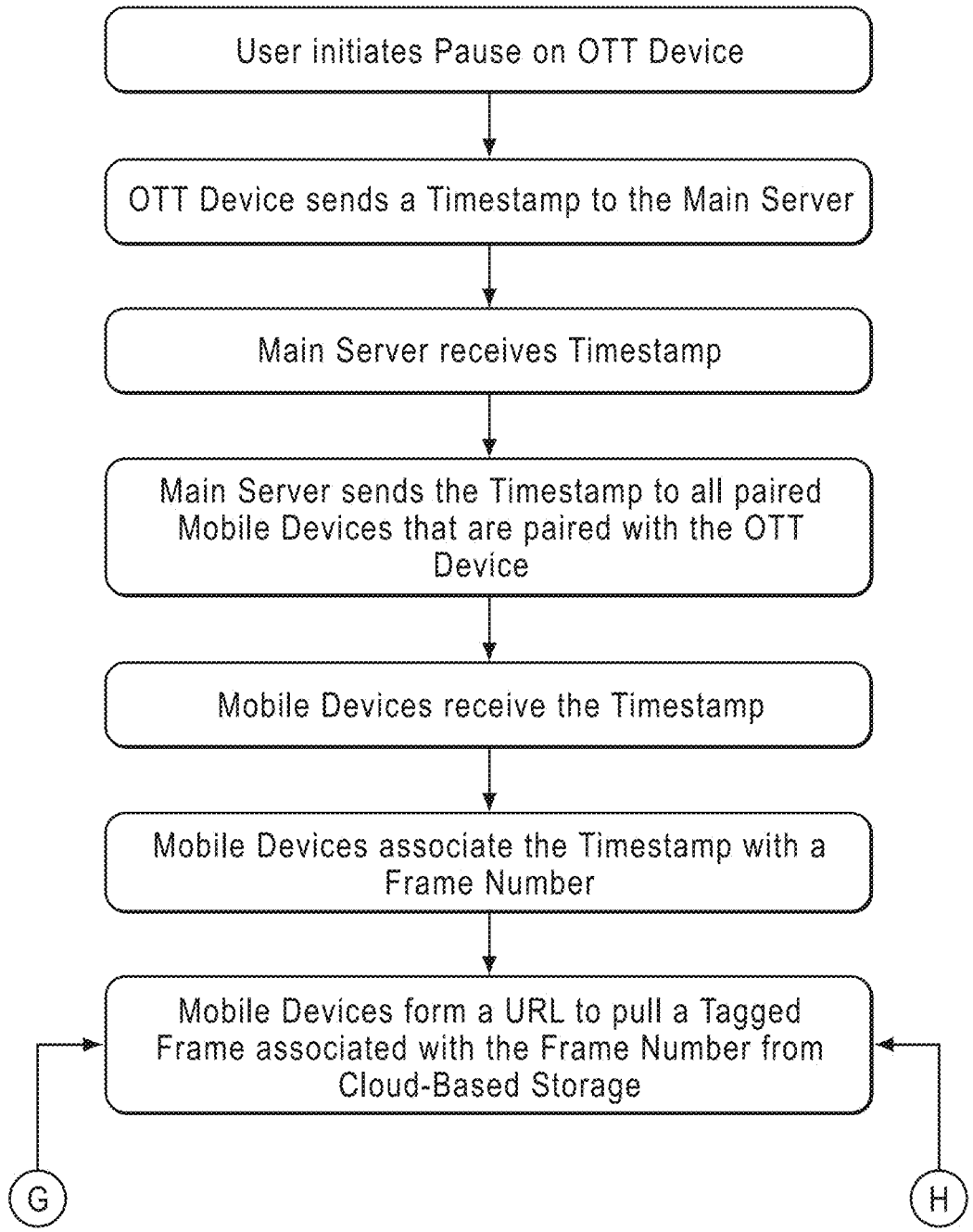
FIGS. 6A-6B is a flow chart showing examples of steps in pausing a video and capturing a tagged frame according to certain methods provided by the present disclosure.
Figure 6B:
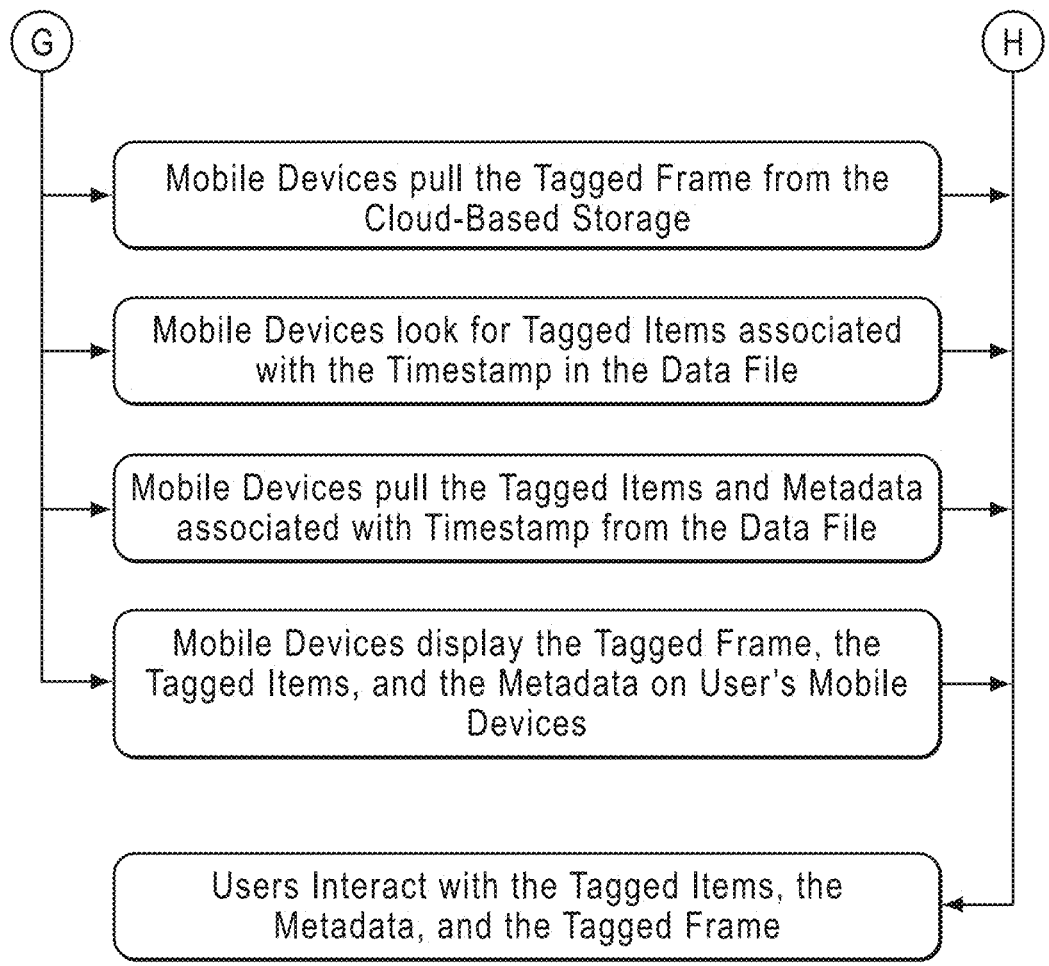

FIGS. 6A-6B shows examples of method steps associated with a paused interaction.

A user first initiates a pause on the OTT device. The OTT device sends a timestamp associated with the pause to the main server. The main server receives the timestamp and sends the timestamp to all mobile devices that are paired with the OTT device. Each of the mobile devices receives the timestamp and associates the timestamp with a frame number. Each of the mobile devices form a URL to pull the tagged frame associated with the frame number from cloud-based storage. Each of the mobile devices pull the tagged frame from cloud-based storage, look for tagged items associated with the timestamp in the data file, pull the tagged items and metadata associated with the timestamp from the data file, and display the tagged frame, the tagged items, and the metadata on each of the mobile devices.

Each of the users can then interact with the tagged frame, the tagged items, and/or the metadata that are displayed on their mobile device.

The tagging database includes timestamps, tagged frames associated with the timestamps, tagged items associated within the timestamps, and metadata associated with the timestamps. This database can be constructed and formatted in various ways. The function of the tagging database is to provide associations between tagged frames of OTT content, tagged items within the tagged frames, and metadata associate with the tagged frame and/or the tagged items.

OTT content comprises a plurality of frames. Although each of the plurality of frames of OTT content can be tagged, it can be more effective to have only certain frames be tagged, or to have a portion of the plurality of frames be tagged. For example, every fifth frame can be tagged. A tagged frame refers to a frame in which certain items shown in the frame can be tagged, where a tagged item is associated with metadata corresponding to the item and providing information about the item.

For example the tagged items can be categorized in terms of people, places, and products such as fashion, beauty, household, furnishings, toys, or other categories.

The displayed metadata for a tagged item can include a picture of the item, a description of the item, a name of an item, a cost of an item, and hyperlinks providing access to further information about an item or enabling interaction concerning the tagged item. For example, in the screen shot shown in FIGS. 7A-7C and 8A-8B, links to social media sites are readily accessible. A user can share the frame and associated items via SMS, Email or Social media. A user can, for example, 'Like' a frame by double tapping on the frame or touching an icon. If a user likes a frame and all the items underneath are stored in a separate feed in the 'Like' tab.

Figure 7C:
FIGS. 7A-7C are screen shots of a tagged frame and categorized tagged items on a user's mobile device according to certain methods provided by the present disclosure.
Figure 7B:
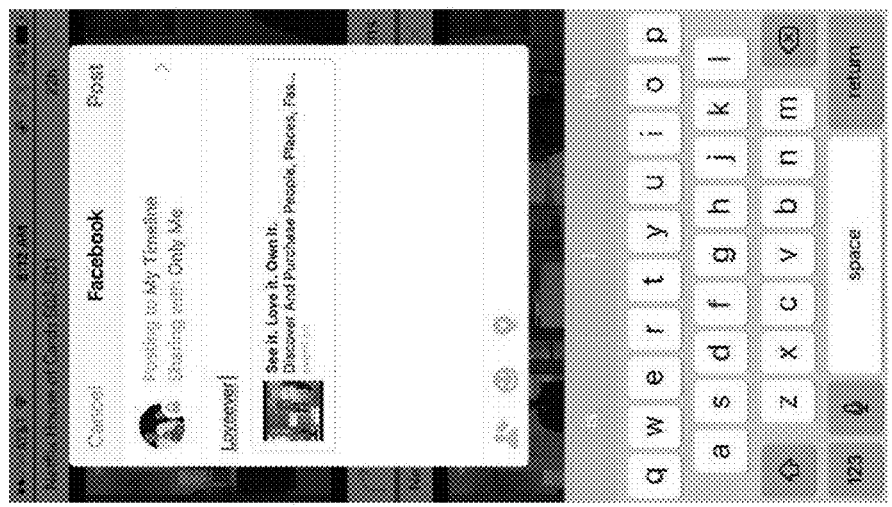
Figure 7A:
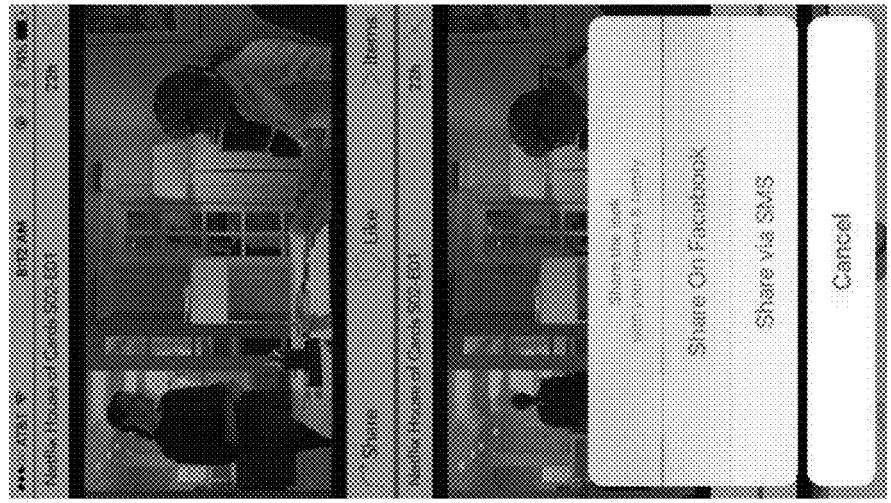

For example, interactions with people can include social media interactions such as facilitated by Instagram, Twitter, Facebook, IMDB and others. FIGS. 7A-7C show screenshots associated with users interacting with a tagged item through Facebook.

Figure 8A:
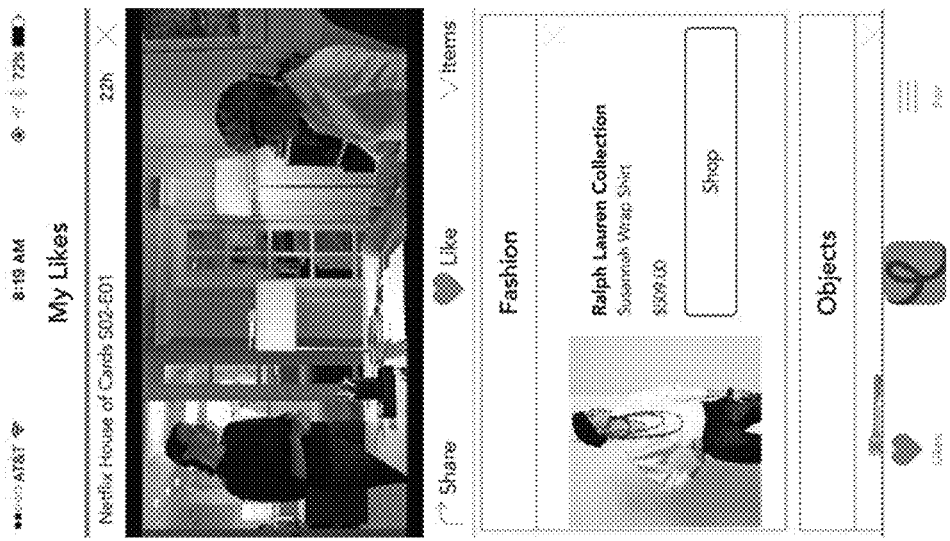
FIGS. 8A-8B are screen shots of a tagged frame and categorized tagged items on a user's mobile device according to certain methods provided by the present disclosure.
Figure 8B:
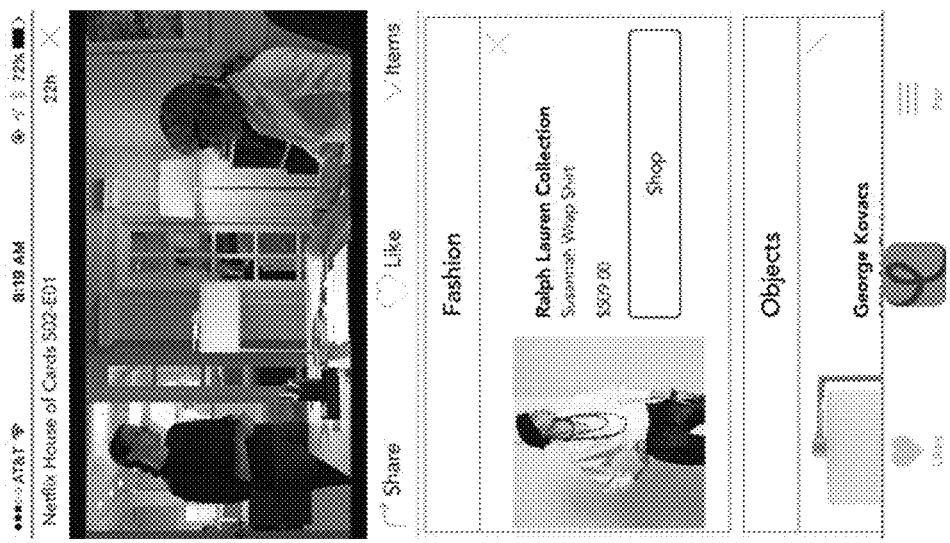

For example, FIGS. 8A-8B show screenshots of a tagged frame and below the frame, categorized tagged items associated with the tagged frame. The tagged items are shown and include the white blouse and the lamp. The tagged items can be categorized for ease of viewing and access. For example, as shown in FIGS. 8A-8B, the items are categorized at least into fashion and objects, where the blouse is included in the fashion category, and the lamp is included in the object category.

A hyperlink can also provide access to a retailer's website enable a user to purchase a tagged item. For example, as shown in FIGS. 8A-8B, a "shop" link provides access to a retailer's website for purchasing the displayed item or similar items.

The software application can also include analytics to monitor, accumulate, and analyze useful information. For example, the analytics can record transactions that take place using the methods to track sales and credits associated with the sales. Information useful to retailers can also be tracked. For example, engagement of users to frames within a video can be monitored, and engagement with tagged items within a tagged frame can be monitored. These interactions can be useful for product placement. Social media interactions involving the items displayed on the user's mobile device can also be monitored and analyzed.

Other embodiments of systems and methods are provided as follows.

According to certain embodiments of the system and methods, a person who is watching a streaming video wonders about an item (s)he sees on the TV screen, presses a button on a mobile software application to discover what the item is and/or purchase the item. The items could be clothing and accessories the actors are wearing and/or objects like tables, chairs, lamps, etc. and/or places like homes, beaches, etc. and/or people.

After the person presses the button on the mobile software application, a signal is sent over the Internet to the server which is streaming the video. The server then sends another signal to the software application that is used for streaming the video. Generally, this application resides on a streaming device like Apple TV, Roku, Android TV, or directly on Smart TVs which have the ability to stream video without the need for a separate streaming device. After the software application receives this signal, it sends a signal back to the streaming server with the information about what the person is seeing on TV at the time it received the signal.

When the streaming server receives the information about what the consumer is seeing on the TV screen, it works with proprietary software to select a representative frame among multiple frames that have the same items. Using proprietary software, the representative frame is then compared with a database of items to identify items on the representative frame. The identified items are tagged on the representative frame and this Representative frame with tagged items is sent to the person's mobile software application that the person used to press the button. The tags on the representative frame are visually observable.

The proprietary software calculates the delay between when the person touches the button on the mobile software application and when the streaming software application gets the signal so that the person gets the video frame that has the same items the person saw on TV at the time they pressed the button on the mobile software application.

When the person receives the video frame on the mobile software application, (s)he touches the tagged items and is shown information that identifies the item. For example, a dress can be identified by designer, a place with the name, a person by their name and accomplishments, and objects with designers. With the item identification, the user is provided with the opportunity to purchase the item, where applicable.

Proprietary software is used to suggest and identify items similar to the item that is identified on the video frame.

While the person is watching the streaming video and communication is taking place among 1) the mobile software application 2) the streaming server and 3) the software application on a streaming device, the streaming continues without any interruptions.

In certain embodiments of the systems and methods, the person presses the pause button on the remote that pauses the streaming video and the representative frame is identified based on the video frame that is on pause.

In certain embodiments of the systems and methods, the representative frames are identified and tagged using proprietary software before the content becomes available for streaming.

According to an aspect the present invention, methods of discovering over-the-top (OTT) content, comprise: a user viewing OTT content on an OTT device; establishing a connection between the OTT device and the user's mobile device; the user, using the mobile device, capturing a frame of the OTT content; and displaying the captured frame on the user's mobile device.

According to any of the preceding aspects of the present invention, the methods comprise the user interacting with the captured frame using the user's mobile device.

According to any of the preceding aspects of the present invention, the captured frame comprises a tagged frame.

According to any of the preceding aspects of the present invention, displaying comprises displaying the tagged frame, a tagged item associated with the tagged frame, metadata associated with the tagged frame, metadata associated with the tagged item, or a combination of any of the foregoing, According to any of the preceding aspects of the present invention, the methods further comprise the user interacting with the tagged frame, a tagged item associated with the tagged frame, metadata associated with the tagged frame, metadata associated with the tagged item, or a combination of any of the foregoing, using the user's mobile device.

According to any of the preceding aspects of the present invention, interacting with the metadata associated with the tagged frame and the metadata associated with the tagged item comprises opening a hyperlink.

According to any of the preceding aspects of the present invention, the hyperlink comprises information about the tagged item, information about the tagged item, information about an item similar to the tagged item, or a combination of any of the foregoing.

According to any of the preceding aspects of the present invention, the tagged frame comprises one or more tagged items.

According to any of the preceding aspects of the present invention, the methods comprise categorizing the one or more tagged items, and wherein displaying comprises displaying the categorized one or more tagged items on the user's mobile device.

According to any of the preceding aspects of the present invention, interacting with the tagged item comprises sharing item information, liking item information, saving item information, following item information, exploring item information, purchasing the item, or a combination of any of the foregoing.

According to any of the preceding aspects of the present invention, establishing connection comprises establishing bidirectional connection between the OTT device and one or more of user's mobile devices.

According to aspects of the present invention, methods of discovering OTT content comprise: one or more users viewing OTT content playing on an OTT device; wherein each of the one or more users has a mobile device and each of the mobile devices is connected to the OTT device; a user pausing the playing of the OTT content; and downloading a frame associated with the paused OTT content on one or more of the user's mobile devices.

According to any of the preceding aspects of the present invention, the frame comprises a tagged frame.

According to any of the preceding aspects of the present invention, downloading comprises downloading a tagged frame and a data file on one or more of the user's mobile devices, wherein the data file comprises information about a tagged item associated with the tagged frame, metadata associated with the tagged frame, metadata associated with the tagged item or a combination of any of the foregoing.

According to any of the preceding aspects of the present invention, the methods comprise one or more of the users interacting with the tagged frame, the tagged item associated with the tagged frame, the metadata associated with the tagged frame, the metadata associated with the tagged item or a combination of any of the foregoing, on the one or more user's respective mobile device.

According to aspects of the present invention, methods of capturing a discoverable frame from OTT content, comprise: providing a tagging database, wherein the tagging database comprises an association of tagged frames of OTT content, timestamps associated with the tagged frames, tagged items associated with the tagged frames, and metadata associated with the tagged items; playing the OTT content on an OTT device; a user viewing the OTT content and capturing, on a mobile device, a tagged frame of the viewed OTT content; sending a request for a timestamp from the mobile device to the OTT device; the OTT device generating a timestamp; sending the timestamp from the OTT device to the mobile device; associating the timestamp with a frame number associated with a tagged frame; forming a URL associated with the frame number; pulling information associated with the frame number using the URL; and displaying the information associated with the frame number on the mobile device.

According to aspects of the present invention, methods of discovering OTT content, wherein the method comprises: a user viewing OTT content on a video display, wherein, the OTT content comprises at least one tagged frame; and each of the at least one tagged frames comprises at least one tagged item; the user capturing a tagged frame of the at least one tagged frames using a mobile device; and displaying the captured tagged frame and the at least one tagged item associated with the captured tagged frame on the user's mobile device.

According to any of the preceding aspects of the present invention, the methods comprise the user interacting with metadata associated with the at least one tagged item on the mobile device.

According to aspects of the present invention, systems for discovering OTT content, comprise: a main server; a mobile device bidirectionally connected to the main server; an OTT device bidirectionally connected to the main server; a user database connected to the main server; a tagging databased connected to the main server; and an OTT content server connected to the OTT device; wherein the OTT device comprises a content software application; and wherein the mobile device comprises a capture software application.

According to any of the preceding aspects of the present invention, OTT content is playing on the OTT device; and a user activating the capture application on the mobile device downloads frame-level information about the OTT content on the mobile device.

According to the present invention, systems comprise at least one processor; and a memory storing instructions configured to instruct the at least one processor to perform: capturing a frame of OTT content, wherein the capturing is initiated by the user on the user's mobile device; correlating the captured frame with metadata associated with the captured frame, and presenting the captured frame and the associated metadata on the user's mobile device, wherein the user can interact with the metadata.

According to the present invention a computer implemented method comprises: capturing, by a computer system, a frame of OTT content, wherein the capturing is initiated by the user on the user's mobile device; correlating, by the computer system, the captured frame with metadata associated with the captured frame, and presenting, by the computer system, the captured frame and the associated metadata on the user's mobile device, wherein the user can interact with the metadata.

According to the present invention, computer storage medium storing computer-executable instructions are disclosed that, when executed, cause a computer system to perform a computer-implemented method comprising: capturing a frame of OTT content, wherein the capturing is initiated by the user on the user's mobile device; correlating the captured frame with metadata associated with the captured frame, and presenting the captured frame and the associated metadata on the user's mobile device, wherein the user can interact with the metadata.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A method of discovering over-the-top (OTT) content, comprising:
    a user viewing OTT content on an OTT device;
    establishing a bidirectional connection between the OTT device and the user's mobile device;
    the user, using the mobile device, sending a request for a timestamp from the mobile device to the OTT device;
    the OTT device generating a timestamp associated with a tagged frame of the OTT content;
    the OTT device sending the timestamp to the mobile device;
    the mobile device associating the timestamp with a frame number associated with a tagged frame of the OTT content;
    the mobile device forming a URL associated with the frame number;
    the mobile device pulling information associated with the frame number using the URL;
    displaying the information associated with the frame number on the user's mobile device; and
    displaying the tagged frame on the user's mobile device.

2. The method of claim 1, comprising the user interacting with the tagged frame using the user's mobile device.

3. The method of claim 1, wherein displaying information associated with the frame number comprises displaying a tagged item associated with the tagged frame, metadata associated with the tagged frame, metadata associated with the tagged item, or a combination of any of the forgoing.

4. The method of claim 3, comprising the user interacting with the tagged frame, a tagged item associated with the tagged frame, metadata associated with the tagged frame, metadata associated with the tagged item, or a combination of any of the foregoing, using the user's mobile device.

5. The method of claim 4, wherein interacting with the metadata associated with the tagged frame and the metadata associated with the tagged item comprises opening a hyperlink.

6. The method of claim 5, wherein the hyperlink comprises information about the tagged item, information about the tagged item, information about an item similar to the tagged item, or a combination of any of the foregoing.

7. The method of claim 1, wherein information associated with the frame number comprises one or more tagged items.

8. The method of claim 7, comprising categorizing the one or more tagged items, and wherein displaying comprises displaying the categorized one or more tagged items on the user's mobile device.

9. The method of claim 4, wherein interacting with the tagged item comprises sharing item information, liking item information, saving item information, following item information, exploring item information, purchasing the item, or a combination of any of the foregoing.

10. The method of claim 1, wherein establishing a bidirectional connection comprises establishing a bidirectional connection between the OTT device and one or more of a user's mobile devices.

11. A method of discovering OTT content, comprising:
one or more users viewing OTT content playing on an OTT device;
wherein each of the one or more users has a mobile device and each of the mobile devices is bidirectionally connected to the OTT device;
a user pausing the playing of the OTT content; and
the OTT device generating a timestamp associated with a tagged frame corresponding to the paused OTT content and sending the timestamp to a tagging database;
the tagging database sending a tagged frame and information associated with the tagged frame associated with the timestamp to one or more of the mobile devices; and
displaying the tagged frame and the information associated with the tagged frame on the one or more mobile devices.

12. The method of claim 11, comprising downloading the tagged frame and a data file onto one or more of the one or more mobile devices, wherein the data file comprises information about a tagged item associated with the tagged frame, metadata associated with the tagged frame, metadata associated with the tagged item, or a combination of any of the foregoing.

13. The method of claim 12, comprising one or more of the one or more users interacting with the tagged frame, the tagged item associated with the tagged frame, the metadata associated with the tagged frame, the metadata associated with the tagged item or a combination of any of the foregoing, on the one or more user's respective mobile device.

14. A method of capturing a discoverable frame from OTT content, comprising:
providing a tagging database, wherein the tagging database comprises an association of tagged frames of OTT content, timestamps associated with the tagged frames, tagged items associated with the tagged frames, and metadata associated with the tagged items;
playing the OTT content on an OTT device;
a user viewing the OTT content sending a request for a timestamp from a mobile device to the OTT device;
the OTT device generating a timestamp;
the OTT device sending the timestamp from the OTT device to the mobile device;
the mobile device associating the timestamp with a frame number associated with a tagged frame of the OTT content;
the mobile device forming a URL associated with the frame number;
the mobile device pulling information associated with the frame number using the URL from a database; and
displaying the information associated with the frame number on the mobile device.

15. A system for discovering OTT content, comprising:
a main server;
a mobile device bidirectionally connected to the main server;
an OTT device bidirectionally connected to the main server;
a user database connected to the main server;
a tagging database connected to the main server, wherein the tagging database comprises an association of tagged frames of OTT content, timestamps associated with the tagged frames, tagged items associated with the tagged frames, and metadata associated with the tagged items; and
an OTT content server connected to the OTT device;
wherein the OTT device comprises a content software application;
wherein the mobile device comprises a capture software application; and
wherein the content software application and the capture software application are configured to access information associated with a tagged frame of the OTT content.

16. The method of claim 1, wherein the OTT content comprises streaming media.

17. The method of claim 1, wherein the OTT content comprises streaming video.

18. The method of claim 1, wherein establishing a bidirectional connection between the OTT device and the user's mobile device comprises:
establishing a connection between the user's mobile device and a server; and
establishing a connection between the server and the OTT device.

19. The method of claim 1, wherein pulling information comprises pulling information from a database.

* * * * *